US011308813B2

(12) United States Patent
Raabe et al.

(10) Patent No.: US 11,308,813 B2
(45) Date of Patent: Apr. 19, 2022

(54) FLIGHT MANAGEMENT SYSTEM

(71) Applicants: The University of Tokyo, Tokyo (JP); BLUE INNOVATION Co., Ltd., Tokyo (JP)

(72) Inventors: Christopher Thomas Raabe, Tokyo (JP); Shinji Suzuki, Tokyo (JP); Takeshi Tsuchiya, Tokyo (JP); Masayuki Kumada, Tokyo (JP); Kazuya Sakai, Tokyo (JP); Takashi Matsuo, Tokyo (JP); Tsuyoshi Chiba, Tokyo (JP)

(73) Assignees: The University of Tokyo, Tokyo (JP); BLUE INNOVATION Co., Ltd., Tokyo (JP)

( * ) Notice: Subject to any disclaimer, the term of this patent is extended or adjusted under 35 U.S.C. 154(b) by 251 days.

(21) Appl. No.: 16/488,825

(22) PCT Filed: Feb. 27, 2018

(86) PCT No.: PCT/JP2018/007091
§ 371 (c)(1),
(2) Date: Aug. 26, 2019

(87) PCT Pub. No.: WO2018/155700
PCT Pub. Date: Aug. 30, 2018

(65) Prior Publication Data
US 2021/0005091 A1 Jan. 7, 2021

(30) Foreign Application Priority Data
Feb. 27, 2017 (JP) .............................. JP2017-035548

(51) Int. Cl.
*G08G 5/00* (2006.01)
*B64C 39/02* (2006.01)
(Continued)

(52) U.S. Cl.
CPC ......... *G08G 5/0013* (2013.01); *B64C 39/024* (2013.01); *B64D 47/08* (2013.01); *G08G 5/0039* (2013.01); *G08G 5/02* (2013.01)

(58) Field of Classification Search
CPC ...... G08G 5/0013; G08G 5/0039; G08G 5/02; B64C 39/024; B64D 47/08
See application file for complete search history.

(56) References Cited

U.S. PATENT DOCUMENTS

2016/0307447 A1* 10/2016 Johnson ............... G08G 5/0034
2017/0045894 A1* 2/2017 Canoy .................. G05D 1/1101
2017/0286887 A1* 10/2017 Moran ........... G06Q 10/063112

FOREIGN PATENT DOCUMENTS

JP 2002277544 A 9/2002
JP 2007248355 A 9/2007
(Continued)

OTHER PUBLICATIONS

International Search Report dated Apr. 24, 2018 filed in PCT/JP2018/007091.

*Primary Examiner* — Thomas G Black
*Assistant Examiner* — Anthony M Gartrelle
(74) *Attorney, Agent, or Firm* — Rankin, Hill & Clark LLP

(57) ABSTRACT

There is provided a flight management system for managing a flight plan of flying objects that fly among ports. The flight management system includes a plurality of port management apparatuses and a flight management apparatus that manages a flight plan of a plurality of flying objects that autonomously fly among the ports, in which each of the port management apparatuses includes determination means for determining whether or not landing or takeoff of the flying objects on or from the corresponding port is possible, and possibility information output means for transferring to the flying objects possibility information about the possibility, (Continued)

and the flight management apparatus includes flying object information reception means for receiving flying object information including flying object position information about a position of each of the flying objects, flight plan registration means for registering the flight plan for flying between the port as a start point and the port as a target point, flight plan change means for changing the flight plan based on the received flying object position information or changed another flight plan, and instruction information output means for outputting instruction information for instructing the flying object about the flight plan.

8 Claims, 11 Drawing Sheets

(51) Int. Cl.
  B64D 47/08 (2006.01)
  G08G 5/02 (2006.01)

(56) References Cited

FOREIGN PATENT DOCUMENTS

| | | |
|---|---|---|
| JP | 2013054005 A | 3/2013 |
| JP | 2015074277 A | 4/2015 |
| JP | 2017037369 A | 2/2017 |
| WO | 2016109646 A2 | 7/2016 |
| WO | 2016154946 A1 | 10/2016 |
| WO | 2017006421 A1 | 1/2017 |

* cited by examiner

FLIGHT MANAGEMENT SYSTEM

TECHNICAL FIELD

The present invention relates to a flight management system for managing a flight plan by a flying object.

BACKGROUND ART

Conventionally, an application of an unmanned flying object with no boarding of a person has been mainly a use as a toy. However, in recent years, the unmanned flying object has been used in various applications such as crop-spraying, aerial photography, high-altitude inspection, and transportation. The unmanned flying object has been actively developed in various places, and the demand for the unmanned flying objects can conceivably increase more and more in the future.

As a technique related to a flying object that autonomously flies based on previously set route information, there has been known a flying object control system including a terminal apparatus including a map information storage unit, a reception unit that receives from the flying object flying object position information as information representing a three-dimensional position of the flying object, a flight information acquisition unit that acquires flight information as information representing a flight path or a landing position with a position of the flying object represented by the flying object position information as a base point using map information and the flying object position information, and a transmission unit that transmits to the flying object the flight information acquired by the flight information acquisition unit, and a flying object that flies or lands according to the flight path or the landing position represented by the flight information received from the terminal apparatus (Patent Literature 1).

CITATION LIST

Patent Literature

Patent Literature: Japanese Patent Application Laid-Open Publication No. 2015-74277

SUMMARY OF INVENTION

Technical Problem

A flying object that can autonomously fly has been expected to be utilized for a field of logistics. A flying object has also been expected to be circulated through a route while passing through predetermined points and to be utilized for fields such as fields of monitoring and inspection of an installation and an area. However, when the flying object is used in the field of logistics, it is assumed that a facility used for the flying object to land and take off (hereinafter referred to as a port) is used jointly by a plurality of flying objects related to logistics. Accordingly, a flight plan needs to be implemented while controlling the plurality of flying objects and ensuring safety at the port.

The present invention has been made in the view of the above-described circumstances, and is directed to providing a flight management system for managing a flight plan of flying objects that fly among ports.

Solution to Problem

To solve the above-described problem, there is provided a flight management system including a plurality of port management apparatuses that respectively manage ports on and from which flying objects land and take off and a flight management apparatus that manages a flight plan of the plurality of flying objects that autonomously fly among the ports, in which each of the port management apparatuses includes determination means for determining whether or not landing or takeoff of the flying objects on or from the corresponding port is possible, and possibility information output means for transferring to the flying objects possibility information about the possibility, the flight management apparatus includes flying object information reception means for receiving flying object information including flying object position information about a position of each of the flying objects, flight plan registration means for registering the flight plan for flying between the port as a start point and the port as a target point, flight plan change means for changing the flight plan, and instruction information output means for outputting instruction information for instructing the flying object about the flight plan, and the flight plan change means changes the flight plan based on the received flying object position information or changed another flight plan.

When the flight management system is thus configured, the flight plan of the flying objects is changed based on the flying object position information or the change of the other flight plan so that the flight plan among the ports can be implemented.

In a preferred aspect of the present invention, the flying object position information includes information about a position of the flying object that remains waiting to land or the flying object that is waiting to take off upon receiving a determination that landing is impossible or takeoff is impossible.

When the flight management system is thus configured, the flight plan can be changed when each of the ports is congested with the flying objects, for example, so that the congestion can be alleviated and the working quality can be improved.

In a preferred aspect of the present invention, each of the port management apparatuses includes wind information reception means for receiving wind information from a wind sensor installed in the corresponding port, and the determination means determines the possibility using the wind information.

In a preferred aspect of the present invention, the flight management system further includes wind environment simulation means for simulating a three-dimensional wind environment around each of the ports using the wind information obtained by the wind sensor and geographical information about geographical features around the port, in which the possibility information output means transfers to the flying object possibility information determined based on the wind environment.

In a preferred aspect of the present invention, the wind environment simulation means further simulates the wind environment using forecast information about wind.

When the flight management system is thus configured, it is possible to determine flight possibility related to the flight among the ports and correct the flight plan in consideration of an influence of wind around each of the ports.

In a preferred aspect of the present invention, each of the port management apparatuses includes monitoring information reception means for receiving monitoring information from a monitoring sensor installed in the corresponding port and in a monitoring region including at least a part of the port, and the determination means determines the possibility based on the monitoring information.

When the flight management system is thus configured, it is possible to determine flight possibility related to the flight among the ports and correct the flight plan while enhancing safety related to people, flying objects and transport objects.

In a preferred aspect of the present invention, each of the ports includes four or more signal transmission units that respectively transmit short-range wireless signals to the flying objects, and each of the flying objects moves to a landing point of the port based on the signals respectively transmitted from the signal transmission units.

When the flight management system is thus configured, the flying object can be guided to the landing point using the wireless signal.

In a preferred aspect of the present invention, each of the flying objects includes an image pickup unit for picking up images of markers respectively displayed on the ports, and moves to a landing point based on the images picked up by the image pickup unit.

When the flight management system is thus configured, the flying object can be guided to the landing point.

In a preferred aspect of the present invention, each of the flying objects includes possibility information reception means for receiving respective possibility information from the port management apparatuses, and performs landing processing, takeoff processing, standby processing, or flight processing to the other port based on a new flight path after receiving the possibility information.

When the flight management system is thus configured, safety of landing and takeoff of the flying object can be enhanced and can be reflected on the flight plan.

The present invention provides a flight management system for managing a flight plan of a plurality of flying objects that autonomously fly among ports, the flight management system including determination means for determining whether or not landing or takeoff of the flying objects on or from each of the ports is possible, possibility information output means for transferring to the flying objects possibility information about the possibility, flying object information reception means for receiving flying object information including flying object position information about a position of each of the flying objects, flight plan registration means for registering the flight plan for flying between the port at a start point and the port at a target point, flight plan change means for changing the flight plan, and instruction information output means for outputting instruction information for instructing the flying object about the flight plan, and the flight plan change means changes the flight plan based on the received flying object position information or changed another flight plan.

The present invention provides a flight management method using a plurality of port management apparatuses that respectively manage ports on and from which flying objects land and take off and a flight management apparatus that manages a flight plan of the plurality of flying objects that autonomously fly among the ports, in which each of the port management apparatuses includes processing for determining whether or not landing or takeoff of the flying objects on or from the corresponding port is possible, and processing for transferring to the flying objects possibility information about the possibility, the flight management apparatus includes processing for receiving flying object information including flying object position information about a position of each of the flying objects, processing for registering the flight plan for flying between the port at a start point and the port at a target point, processing for changing the flight plan based on the received flying object position information or changed another flight plan, and processing for outputting instruction information for instructing the flying object about the flight plan.

Advantageous Effect of Invention

According to the present invention, there is provided a flight management system for managing a flight plan of flying objects that fly among ports.

DESCRIPTION OF EMBODIMENT

A flight management system according to an embodiment of the present invention will be described below with reference to the drawings. The embodiment described below is an example of the present invention, and is not limited to the embodiment described below. Various configurations can also be adopted. In the present embodiment, a case where a flying object loaded with a transport object LO is autonomously flied among ports to deliver an article by the flying object will be described.

Although a configuration and an operation of the flight management system will be described in the present embodiment, for example, a method, a device, a computer program, a recording medium, and the like each having a similar configuration can also respectively produce similar functions and effects. A flight management apparatus, a port management apparatus, and a wind environment simulator (wind environment simulation means), and a method, a system, a computer program, a recording medium, and the like each having a similar configuration, for example, can also respectively produce similar functions and effects. The program may be stored in the recording medium. If the recording medium is used, the program can be installed into a computer, for example. The recording medium storing the program may be a non-transitory recording medium such as a CD-ROM.

Figure 1:
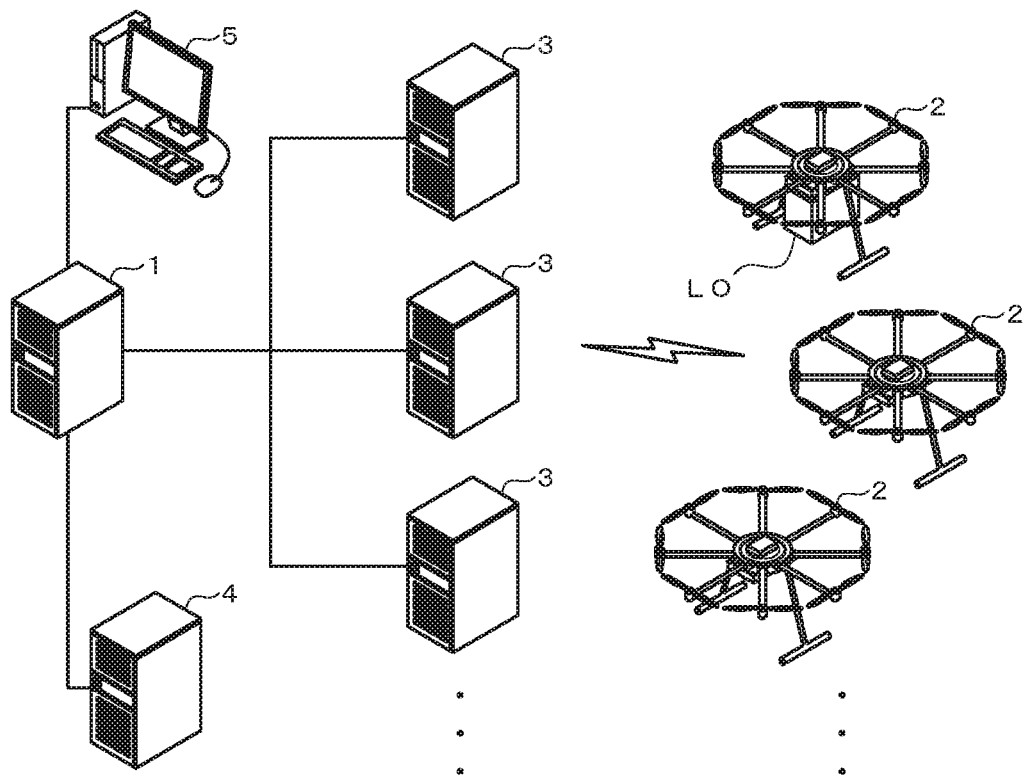
FIG. 1 is a diagram illustrating an outline of a flight management system according to an embodiment of the present invention.

FIG. 1 is a diagram illustrating an outline of a flight management system according to an embodiment of the present invention. The flight management system includes a flight management apparatus 1, flying objects 2, port management apparatuses 3, a wind environment simulator 4, and a user terminal 5.

Figure 2:
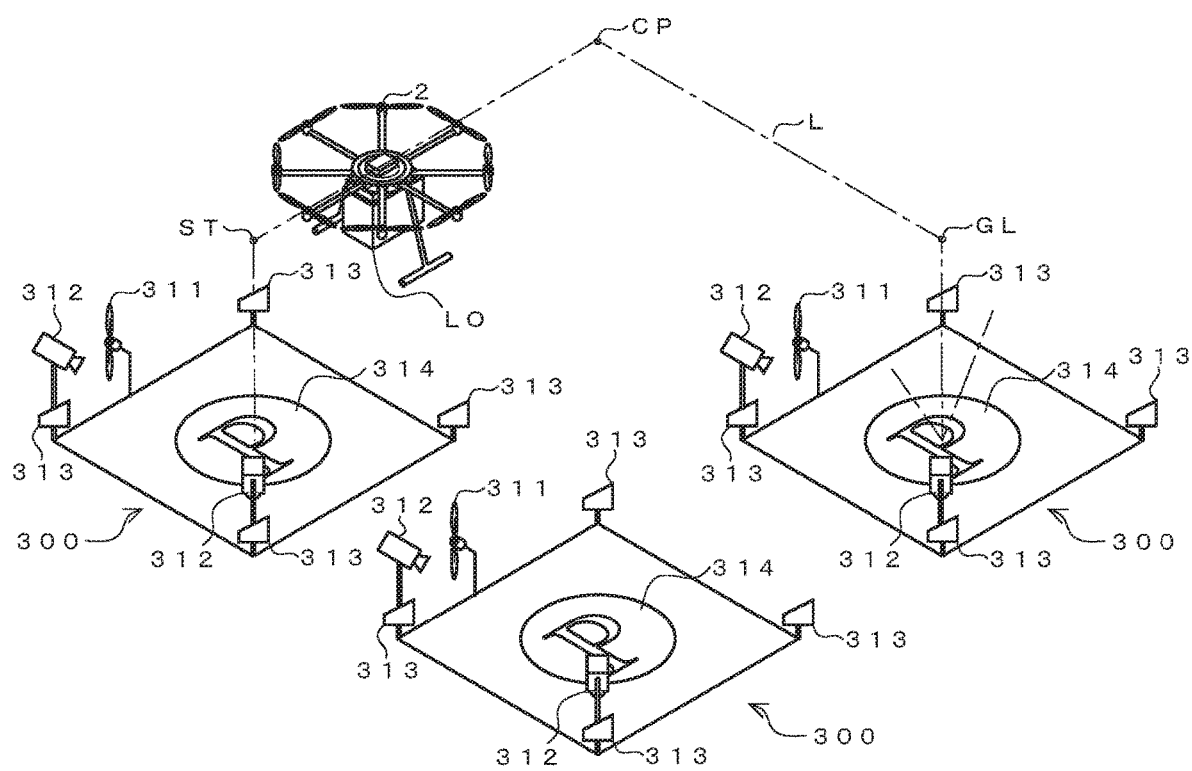
FIG. 2 is a conceptual diagram related to a flight among ports according to the embodiment of the present invention.

FIG. 2 is a conceptual diagram related to a flight among ports according to the present embodiment. A port 300 includes a vane anemometer 311 (a wind sensor), laser sensors 312 (monitoring sensors), four or more signal transmission units 313, and a port marker 314. The port management apparatus 3 is configured to be communicable with the vane anemometer 311, the laser sensors 312, and the four or more signal transmission units 313 that are installed in the port 300.

Figure 3:
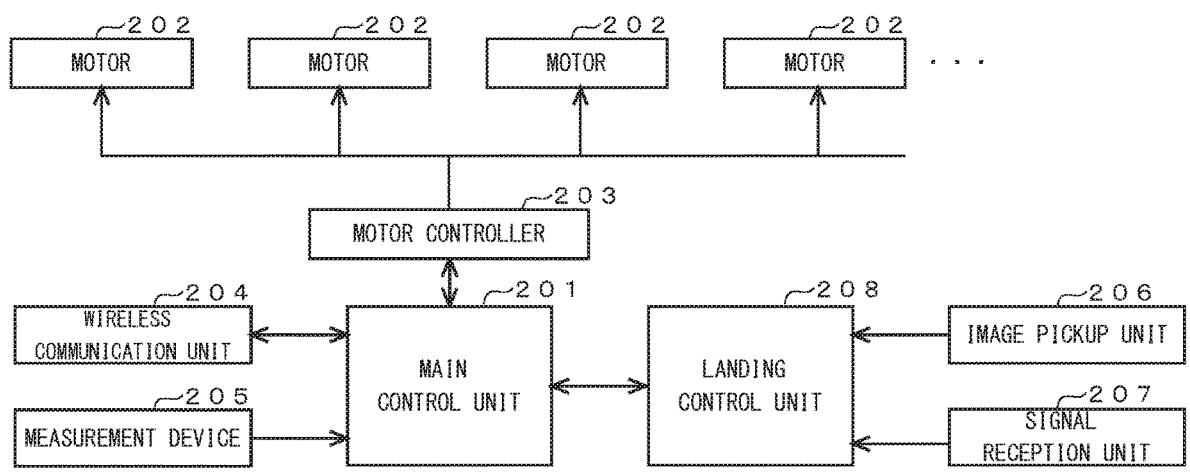
FIG. 3 is a hardware configuration diagram of a flying object according to the embodiment of the present invention.

FIG. 3 is a diagram illustrating an example of a hardware configuration of the flying object 2. The flying object 2 includes a main control unit 201 that controls a flight operation of the flying object 2, for example, motors 202 for driving wings of the flying object 2 and flying the flying object 2, a motor controller 203 that adjusts a power supply amount of electric power to the motors 202 based on a signal from the main control unit 201, a wireless communication unit 204 for communicating with the port management apparatus 3, a measurement device 205 for acquiring flying object information such as the coordinate information, the speed, and the remaining amount of a driving force of the flying object 2, an image pickup unit 206 for picking up an image of a target, a signal reception unit 207 for receiving a signal transmitted from the signal transmission unit 313, and a landing control unit 208.

The flying object 2 according to the present embodiment is a multicopter that flies by driving the plurality of wings using the motors 202. The flying object 2 includes a carrier not illustrated, and can fly with a transport object loaded thereinto.

In the present embodiment, the flying object 2 flies by generating the coordinate information of the flying object 2 using a GNSS (global navigation satellite system) communication unit (the measurement device 205). The coordinate information of the flying object 2 may be generated using a camera and another sensor alone or in combination.

Figure 4:
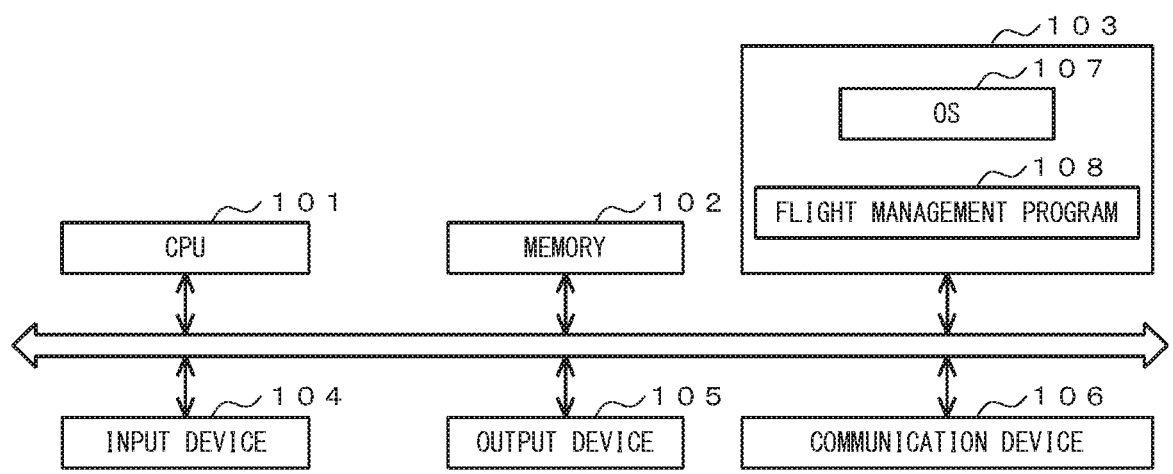
FIG. 4 is a hardware configuration diagram of a flight management apparatus according to the embodiment of the present invention.

FIG. 4 is a diagram illustrating an example of a hardware configuration of the flight management apparatus 1 according to the present embodiment. The flight management apparatus 1 includes a CPU 101, a memory 102, a storage device 103, an input device 104, an output device 105, and a communication device 106 as an interface for communicating with an external apparatus. The storage device 103 records an operating system 107 (OS), a flight management program 108, and the like.

Figure 5:
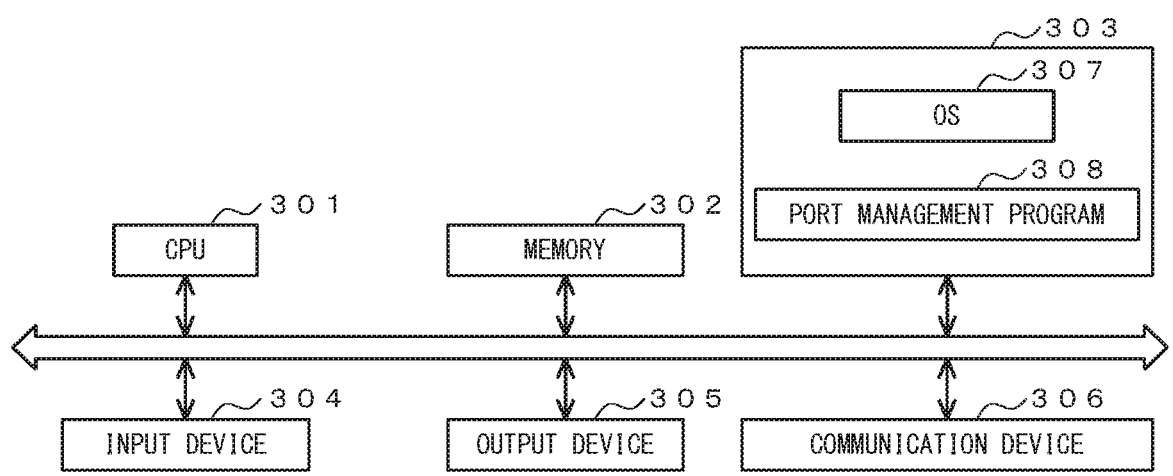
FIG. 5 is a hardware configuration diagram of a port management apparatus according to the embodiment of the present invention.

FIG. 5 is a diagram illustrating an example of a hardware configuration of the port management apparatus 3 according to the present embodiment. The port management apparatus 3 includes a CPU 301, a memory 302, a storage device 303, an input device 304, an output device 305, and a communication device 306 as an interface for communicating with the external apparatus. The storage device 303 records an operating system 307 (OS), a port management program 308, and the like.

In the present embodiment, the wireless communication unit 204 in the flying object 2 and the communication device 306 in the port management apparatus 3 perform communication using a wireless LAN such as a Wi-Fi.

The user terminal 5 in the present embodiment is a PC. In addition, a smartphone, a tablet terminal, a wearable device, and the like can be appropriately used to match the embodiment.

Figure 6:
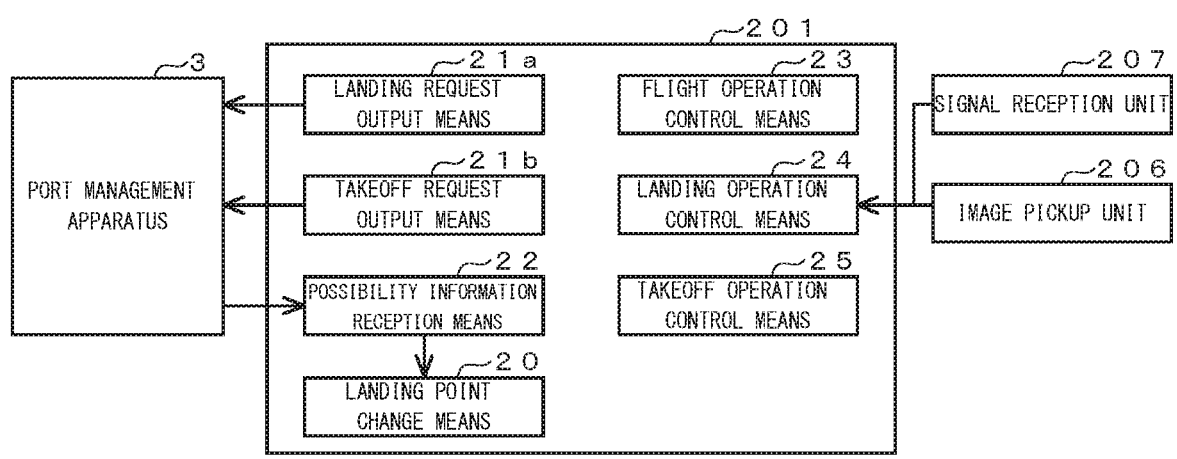
FIG. 6 is a functional block diagram of the flying object according to the embodiment of the present invention.

FIG. 6 is a functional block diagram of the flying object 2. The flying object 2 includes landing point change means 20, landing request output means 21a (output request means), takeoff request output means 21b (output request means), possibility information reception means 22, flight operation control means 23, landing operation control means 24, and takeoff operation control means 25.

The flying object 2 receives instruction information outputted via the communication device 106 in the flight management apparatus 1. The instruction information is information about an operation performed by the flying object 2 to implement a flight plan, and includes information such as a takeoff point and a landing point and a path of a flight. The information included in the instruction information in the present embodiment each includes a plurality of information. The flying object 2 that is flying in a first flight path given by first instruction information is configured to enable a change of the first flight path to second (and subsequent) flight paths based on a predetermined condition, described below. The second (and subsequent) flight paths may be set by second (and subsequent) instruction information newly received from the flight management apparatus 1 and the port management apparatus 3, may be set by information such as a landing point and a path related to the second (and subsequent) flight paths previously included in the first instruction information and stored in the flying object 2, or may be set by information such as a landing point and a path related to the second (and subsequent) flight paths stored in the flying object 2 using another method.

If landing is not permitted at a certain landing point but the flying object 2 is moved to a predetermined retreat location provided around the port until landing on the port is permitted (retreat processing), a flight to the retreat location (landing point) is performed using information about a point of the retreat location and information about a path to the retreat location. If landing is not permitted at a certain landing point but the flying object 2 is moved to another alternative port (hereinafter referred to as flight processing to another port or reroute processing), the flying object 2 performs flight processing to the other port using information about a point of the other port and information about a path to the other port. The landing point change means 20 changes the landing point based on instruction information included in received possibility information, instruction information transmitted from the flight management apparatus 1 and the port management apparatus 3 in addition to the possibility information, and the like. As a result, the flying object 2 performs retreat processing to the retreat location or reroute processing (flight processing to the other port). The retreat location may be, for example, an open space in the vicinity of the port 300 on which landing has been rejected or may be the other port 300. The other port is a port, on which landing is possible, existing around the port on which landing has not been permitted.

Examples of information about a flight path L of the flying object 2 include a position (coordinate information, etc.) of a start point ST at which the flying object 2 starts, a position (coordinate information, etc.) of a landing point GL, a position or positions (coordinate information, etc.) of zero, one, or two or more relay points CP between the start point ST and the landing point GL, and information such as an altitude at each of the points, a departure time, and an estimated arrival time at each of the positions, as illustrated in FIG. 2.

The flight operation control means 23 autonomously flies the flying object 2 based on the instruction information received by the flying object 2, to realize a flight among the ports. The instruction information need not necessarily be received via the port management apparatus 3, but may be directly received from the flight management apparatus 1 or received via another apparatus.

The landing request output means 21*a* (output request means) outputs a landing request signal to the communication device 306 in the port management apparatus 3 from the wireless communication unit 204 in the flying object 2. Similarly, the takeoff request output means 21*b* (output request means) outputs a takeoff request signal to the communication device 306 in the port management apparatus 3 from the wireless communication unit 204 in the flying object 2.

The possibility information reception means 22 receives possibility information about landing or takeoff transmitted from the communication device 306 in the port management apparatus 3 via the wireless communication unit 204 in the flying object 2. The flying object 2 in the present embodiment performs landing processing and standby processing or reroute processing (flight processing to the other port) when it has outputted a landing request signal and received possibility information. Note that the landing request output means 21*a* (output request means) need not necessarily be provided in the flying object 2, but the flying object 2 may be configured to receive possibility information from the port management apparatus 3 without outputting a request signal toward the port management apparatus 3 to perform some or all of the processing. The landing processing is processing for landing on the port performed when the possibility information reception means 22 has received possibility information about a landing permission. The standby processing is processing for waiting at a predetermined point in a flight path during a flight and processing for moving to a predetermined retreat location when the possibility information reception means 22 has not received the landing permission (has received possibility information about a landing non-permission, for example). The reroute processing (flight processing to the other port) is processing for flying to the other port when the possibility information reception means 22 has not received the landing permission (has received the possibility information about the landing non-permission, for example).

The flying object 2 performs takeoff processing or standby processing when it has outputted a takeoff request signal and received possibility information. Note that the takeoff request output means 21*b* (output request means) need not necessarily be provided in the flying object 2, but the flying object 2 may be configured to receive the possibility information from the port management apparatus 3 without outputting the request signal toward the port management apparatus 3 to perform some or all of the processing. The takeoff processing is processing for takeoff from the port performed when a takeoff permission has been received. The standby processing is processing for waiting on the port or processing for moving to a predetermined retreat location to wait when the takeoff request signal has been outputted and the takeoff permission has not been received. As the standby processing, a flight path to a retreat location may be set based on new instruction information received by the flying object 2, or a flight path may be set based on information for standby processing previously stored in the flying object.

Figure 7:
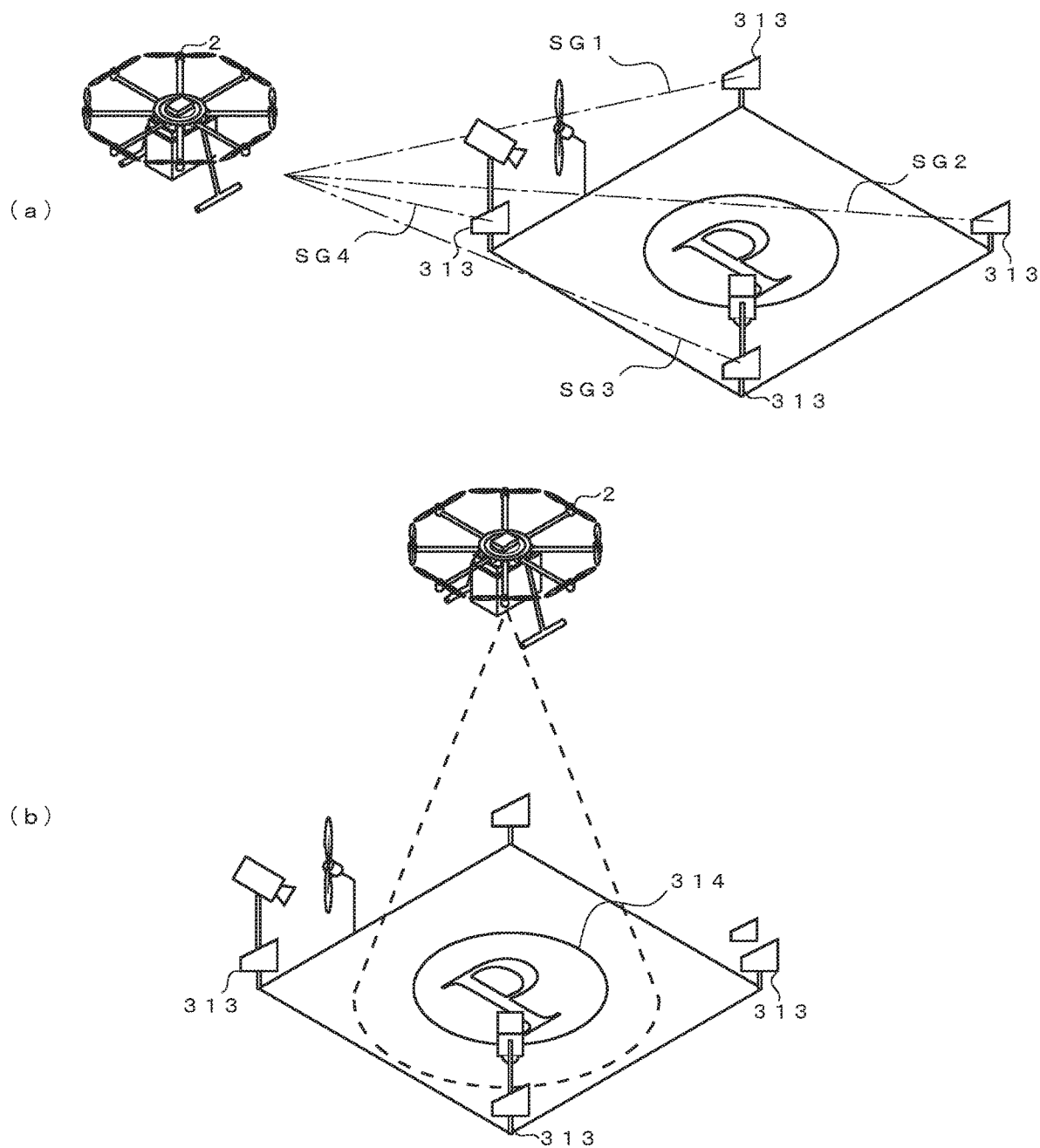
FIG. 7 is a conceptual diagram related to landing processing on the port according to the embodiment of the present invention.

The landing operation control means 24 performs operation control for the flying object 2 to land. FIG. 7 is a diagram illustrating an operation performed when the flying object 2 lands. First, the flying object 2 receives signals SG (SG1 to SG4 in an illustrated example) respectively transmitted from the signal transmission units 313 when it has approached the port 300 to some extent, as illustrated in FIG. 7 (*a*). The signal is a short-range wireless signal conforming to Bluetooth (registered trademark) or a Wi-Fi standard, for example.

The landing operation control means 24 included in the landing control unit 208 calculates a positional relationship between each of the signal transmission units 313 and the flying object 2 based on a signal intensity or the like of the signal, and the flying object 2 approaches the marker 314 at the landing point. When the flying object 2 has approached the marker 314 to some extent, as illustrated in FIG. 7 (*b*), an image of the marker 314 is picked up using the image pickup unit 206. The landing operation control means 24 included in the landing control unit 208 calculates its own position, direction, incline relative to the landing position, and the like based on image data of the picked-up image of the marker 314, and the flying object 2 lands with its altitude decreased.

The takeoff operation control means 25 performs operation control for the flying object 2 to take off.

Flying object position information is information for specifying a situation of the flying object 2 and the port 300. An example is information for specifying a state where the flying object 2 at the certain port 300 is waiting and a state where the certain flying object 2 is flying between the certain ports. In the present embodiment, flying object position information is generated using information for identifying the flying object 2 given to the port management apparatus 3 when the flying object 2 and the port management apparatus 3 have communicated with each other. The port management apparatus 3 combines identification information and a state (standby (waiting for a takeoff permission or waiting for a landing permission), landing completion, takeoff completion, etc.) of the flying object 2 and identification information of the port management apparatus 3 (the port 300) as flying object position information. As a result, a congestion situation of each of the ports 300 and a determination whether or not a flight plan is progressing as planned can be managed on the side of the flight management apparatus 1, and can be used for a change of the flight plan, for example. For example, the flight management apparatus 1 determines the port, on which the flying object 2 can land, existing around the port, generates instruction information for performing flight processing to the determined port (other port), and transfers the instruction information to the flying object 2, to perform reroute processing (flight processing to the other port) in the flying object 2 based on the acquired flying object position information and a distance (proximity) between the ports.

When the flying object 2 and the port management apparatus 3 communicate with each other, coordinate information of the flying object 2 may be transferred to the port management apparatus 3 from the flying object 2 and transferred to the flight management apparatus 1 as flying object position information from the port management apparatus 3. Note that the flying object position information need not necessarily be outputted to the flight management apparatus 1 via the port management apparatus 3, but may be directly transferred to the flight management apparatus 1 from the flying object 2 or transferred to the flight management apparatus 1 via another apparatus.

Figure 8:
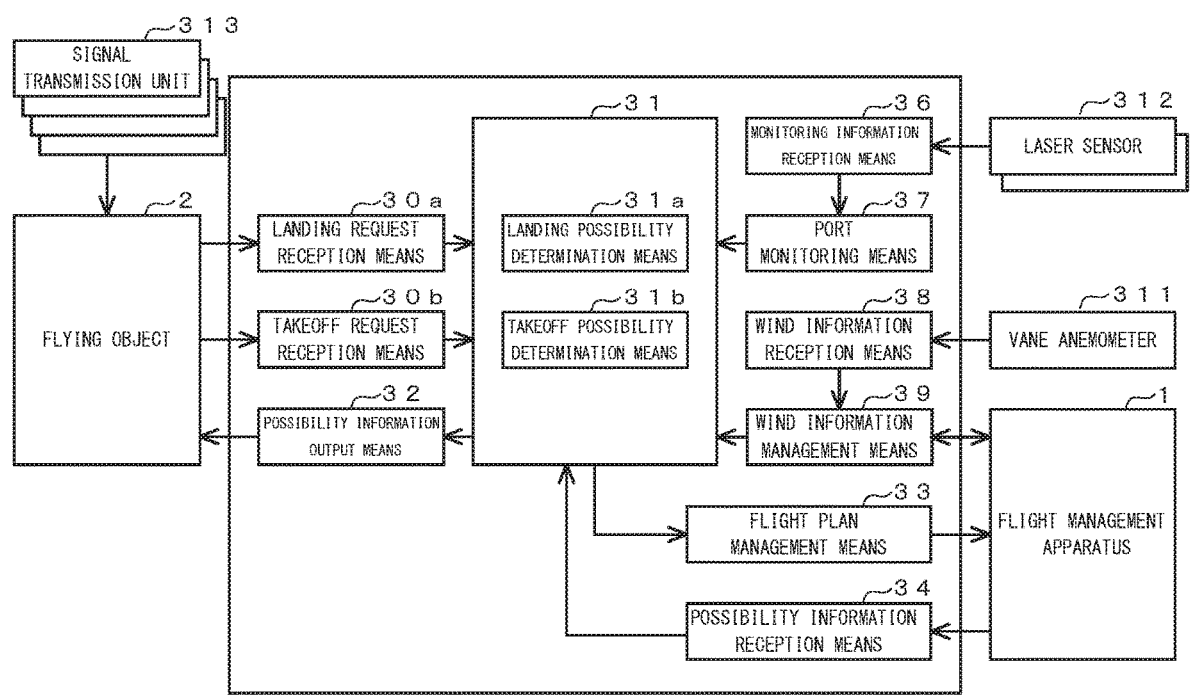
FIG. 8 is a functional block diagram of the port management apparatus according to the embodiment of the present invention.

FIG. 8 is a functional block diagram of the port management apparatus 3. The port management apparatus 3 includes landing request reception means 30a for receiving a request to output possibility information, takeoff request reception means 30b for receiving a request to output possibility information, determination means 31 (landing possibility determination means 31a and takeoff possibility determination means 31b), possibility information output means 32, flight plan management means 33, possibility information reception means 34, monitoring information reception means 36, port monitoring means 37, wind information reception means 38, and wind information management means 39.

The landing request reception means 30a receives a landing request outputted from the landing request output means 21a via the wireless communication unit 204 in the flying object 2 and the communication device 306 in the port management apparatus 3. The takeoff request reception means 30b receives the landing request outputted from the landing request output means 21a.

The determination means 31 (the landing possibility determination means 31a and the takeoff possibility determination means 31b) determine whether or not landing or takeoff is possible. The determination means 31 generates possibility information for controlling at least one of landing and takeoff of the flying object 2 based on a determination result of the determination means 31 and information received from the flight management apparatus 1 via the possibility information reception means 34. The possibility information output means 32 transfers the possibility information to the flying object 2. In the present embodiment, the possibility information output means 32 outputs the generated possibility information via the communication device 306.

The flight plan management means 33 outputs the flying object position information about the flying object 2 to the flight management apparatus 1.

The port management apparatus 3 may include short-range wireless signal control means for controlling transmission of a short-range wireless communication signal by the signal transmission unit 313. Examples of the control of the transmission include processing for starting to transmit a signal when an estimated landing time of the flying object 2 has been almost reached and processing for finishing transmitting a signal by the signal transmission unit 313 after landing.

The monitoring information reception means 36 receives monitoring information from the laser sensor 312. The laser sensor 312 monitors a monitoring region including at least a part of the port 300, and generates monitoring information for monitoring. In the present embodiment, two laser sensors 312 are respectively arranged along diagonal lines of each of the ports 300, and emit and receive laser light and generate monitoring information from information about the light reception. The port monitoring means 37 detects an intruder into the port 300 or detects an intrusion of an obstacle, for example, and transfers information about the detection to the determination means 31 based on the monitoring information. The port monitoring means 37 may be configured not to perform detection under a predetermined condition. For example, the port monitoring means 37 may be configured not to perform detection from the time point where it has outputted possibility information to the flying object 2 and has received a response signal to the possibility information from the flying object 2 until it receives a predetermined time period or a predetermined signal.

The wind information reception means 38 receives wind information from the vane anemometer 311. The vane anemometer 311 acquires a wind direction and a wind speed at least one location around the port 300, and generates wind information. The wind information may be information about only the wind speed, for example. The wind information management means 39 transfers the wind information to the determination means 31 or transfers the wind information to the wind environment simulator 4. The wind information need not necessarily be transferred to the wind environment simulator 4 via the flight management apparatus 1, but may be transferred from the port management apparatus 3 directly or via another apparatus.

Figure 9:
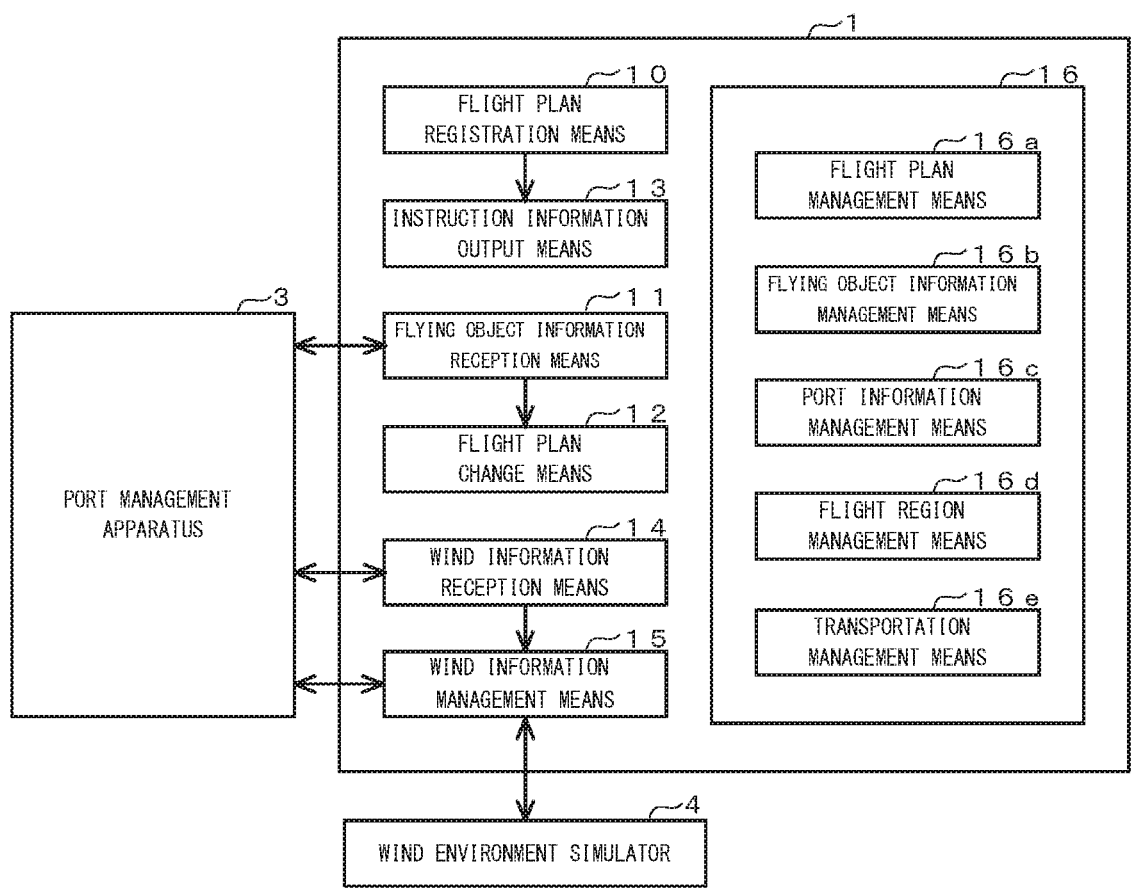
FIG. 9 is a functional block diagram of the flight management apparatus according to the embodiment of the present invention.

FIG. 9 is a functional block diagram of the flight management apparatus 1. The flight management apparatus 1 includes flight plan registration means 10, flying object information reception means 11, flight plan change means 12, instruction information output means 13, wind information reception means 14, wind information management means 15, and a flight information management unit 16.

The flight information management unit 16 receives a registration request, a change request, or the like of information about a flight plan from the user terminal 5, and manages the information. In the present embodiment, the flight information management unit 16 includes flight plan management means 16a for managing the registered flight plan, flying object information management means 16b for managing information about the flying object that flies among the ports, port information management means 16c for managing information about each of the ports 300, flight region management means 16d, and transportation management means 16e.

The flight plan management means 16a manages the registered flight plan. Examples of the flight plan include information about the above-described flight path, information about the flying object allocated to the flight plan, and information about a transport object to be transported.

The flying object information management means 16b manages flying object information of the flying object 2 that flies among the ports. Examples of the flying object information include an identifier of the flying object 2, information about a loadable amount of the flying object 2, information about a working state of the flying object 2 such as "waiting" or "working", and information about the flight plan during execution or before execution allocated to the flying object 2.

The port information management means 16c manages port information of the port 300. Examples of the port information include an identifier of the port 300, information about the location of the port 300, and information about a retreat location in a case where the flying object 2 cannot land on the port 300.

The flight region management means 16d manages flight region information about a flight region. Examples of the flight region information include map information, information about weather, and information about restriction on a flight of the flying object 2, such as a zone where the flight of the flying object 2 is restricted, a zone where an altitude at which the flying object 2 can fly is restricted, and a zone where the flight of the flying object 2 is forbidden to fly.

The transportation management means 16e manages the information about the transport object to be transported by the flying object 2. Examples of the transport object information include information such as size, weight, item, consignor, consignee, pickup date, and desired delivery date of the transport object.

The flight plan registration means 10 receives the flight plan registration request and the flight plan change request from the user terminal 5. When new transport object information is registered as a flight plan via the transportation management means 16e, for example, the flying object 2 that can perform transportation in consideration of the registered flight plan, flying object information, and the like is derived and registered.

The flying object information reception means 11 receives the flying object position information from the port management apparatus 3. Although a case where permissions such as landing and takeoff permissions are not given so that the flying object 2 can neither land on nor take off from the port as scheduled is assumed, the flight object information reception means 11 can grasp at which position the flying object 2 is at present based on the flying object position information. The flight plan change means 12 determines congestion of the flying object 2, for example, based on the flying object position information received by the flying object information reception means 11 and the flight plan, and appropriately changes the flight plan. The flying object information reception means 11 may acquire flying object information such as a battery remaining amount and coordinate information of the flying object 2 in addition to the flying object position information. The flight plan change means 12 may change the flight plan further using the received flying object information.

The instruction information output means 13 outputs the newly registered flight plan to the flying object 2. Although the instruction information is transmitted to the flying object 2 in the present embodiment, the instruction information may be transmitted to the flying object 2 from the flight management apparatus 1 via the port management apparatus 3 or the other apparatus. Instruction information about the flight plan changed by the flight plan change means 12 may be transferred to the flying object via the port management apparatus 3.

The wind information reception means 14 receives wind information from the port management apparatus 3. The received wind information is transferred to the wind environment simulator 4 via the wind information management means 15. The wind environment simulator 4 generates wind environment information based on geographical information including geographical features around each of the ports and the received wind information. The wind environment information may be generated using wind information by weather prediction, for example. The wind environment information is transferred to the port management apparatus 3, and is used to determine possibility in the determination means 31. A partial function or an entire function of the wind environment simulator 4 (simulation means) may be provided in the flight management apparatus 1, or may be provided in the user terminal 5, for example. The user terminal 5 may include means for displaying the wind environment information and means for controlling possibility of landing and takeoff on and from each of the ports 300, for example.

Figure 10:
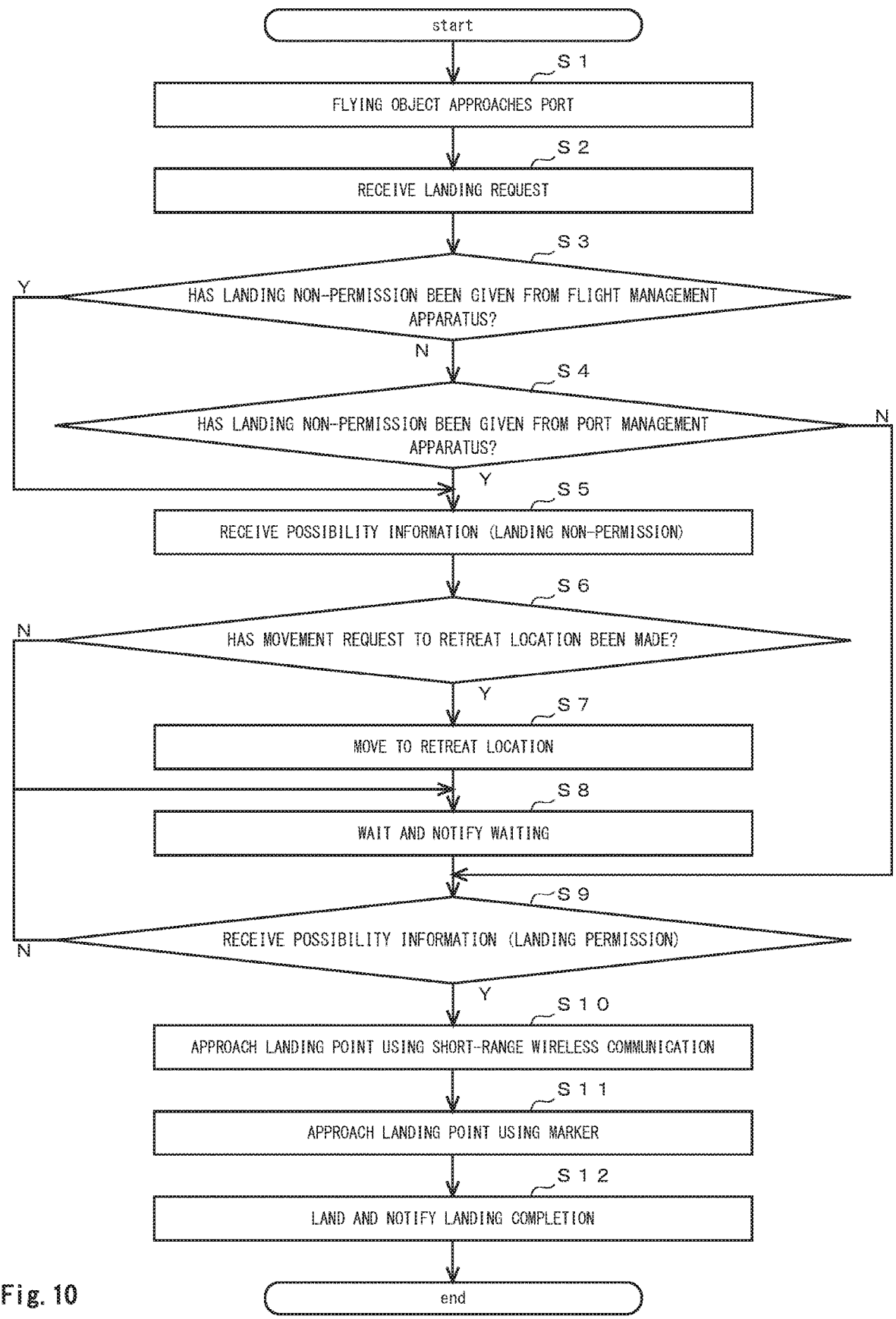
FIG. 10 is a processing flowchart related to landing processing on the port according to the embodiment of the present invention.

Then, landing processing on the port 300 by the flying object 2 will be described with reference to FIG. 10. The flying object 2 performs an autonomous flight based on instruction information, and flies to the vicinity of the port on which the flying object 2 is scheduled to land. When the flying object 2 approaches the port 300 (step S1), the landing request output means 21a makes a landing request to the port management apparatus 3 (step S2).

When the landing request reception means 30a receives the landing request, the landing possibility determination means 31a determines whether or not landing is possible. If a landing non-permission has not be given from the flight management apparatus 1 (No (N) in step S3), the processing proceeds to step S4. If the landing non-permission has been given from the flight management apparatus 1 (Yes (Y) in step S3), the processing proceeds to step S5.

Examples of a case where the landing non-permission is given from the flight management apparatus 1 include a case where a flight plan has been changed by the flight plan change means 12. In a state where the flying object 2 and the port management apparatus 3 can communicate with each other, instruction information may be transferred to the flying object 2.

If the landing non-permission has not been given from the port management apparatus 3 (No (N) in step S4), the processing proceeds to step S9. If the landing non-permission has been given from the port management apparatus 3 (Yes (Y) in step S4), possibility information about the landing non-permission is outputted.

Examples of a case where the landing non-permission is given from the port management apparatus 3 include a case where landing is restricted based on wind information obtained by the vane anemometer 311, a case where landing is restricted based on a wind environment received from the wind environment simulator 4, and a case where landing is restricted based on monitoring information obtained by the laser sensor 312 (e.g., a case where a person, an object, another flying object, or the like exists within the port).

The flying object 2 receives the possibility information about the landing non-permission via the wireless communication unit 204 (step S5). In this case, if an instruction to move to a predetermined retreat location has been issued, the flying object 2 autonomously flies to the retreat location (step S7), and the flying object 2 performs standby processing (step S8). The retreat location may be a landing location having a similar configuration to that of the port 300, or may be in the air. When retreat processing using the other port 300 as the retreat location is performed or when reroute processing (flight processing to the other port) is performed, the processing returns to step S1. If the flying object 2 has waited, the port management apparatus 3 outputs flying object position information about standby to the flight management apparatus 1 via the flight plan management means 33.

The flying object 2 waits until it receives possibility information about a landing permission on the port 300 (step S8). If the possibility information about the landing non-permission has been outputted from neither the flight management apparatus 1 nor the port management apparatus 3 (No (N) in step S4) or if the flying object 2 has received the possibility information about the landing permission (Yes (Y) in step S9) after waiting in step S8, the flying object 2 performs the landing processing.

The flying object 2 approaches a landing point using a short-range wireless communication signal transmitted from the signal transmission unit 313 (step S10). Then, the flying object 2 approaches the landing point using the marker 314

(step S11), to land. If the landing of the flying object 2 has been completed, the port management apparatus 3 outputs flying object position information about landing completion to the flight management apparatus 1 via the flight plan management means 33.

Figure 11:
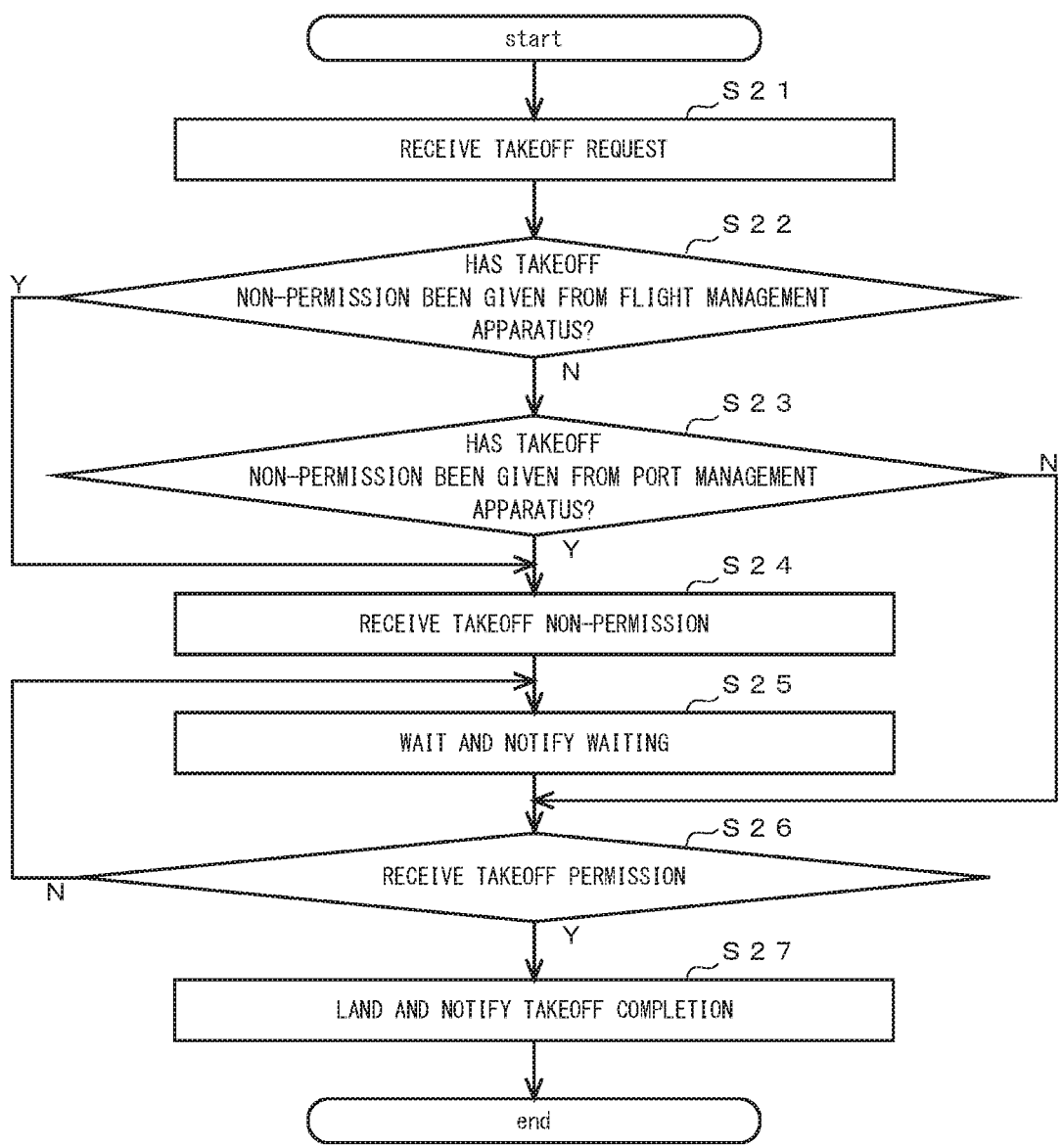
FIG. 11 is a processing flowchart related to takeoff processing from the port according to the embodiment of the present invention.

Then, takeoff processing from the port 300 by the flying object 2 will be described with reference to FIG. 11. The takeoff request output means 21b in the flying object 2 makes a takeoff request to the port management apparatus 3 (step S21).

When the takeoff request reception means 30b receives the takeoff request, the takeoff possibility determination means 31b determines whether or not takeoff is possible. If a takeoff non-permission has not been given from the flight management apparatus 1 (No (N) in step S22), the processing proceeds to step S23. If the takeoff non-permission has been given from the flight management apparatus 1 (Yes (Y) in step S22), the processing proceeds to step S24.

Examples of a case where the takeoff non-permission is given from the flight management apparatus 1 include a case where a flight plan has been changed by the flight plan change means 12. In a state where the flying object 2 and the port management apparatus 3 can communicate with each other, instruction information may be transferred to the flying object 2.

If the takeoff non-permission has not been given from the port management apparatus 3 (No (N) in step S23), the processing proceeds to step S26. If the takeoff non-permission has been given from the port management apparatus 3 (Yes (Y) in step S23), possibility information about the takeoff non-permission is outputted.

Examples of a case where the takeoff non-permission is given from the port management apparatus 3 include a case where takeoff is restricted based on wind information obtained by the vane anemometer 311, a case where takeoff is restricted based on a wind environment received from the wind environment simulator 4, and a case where takeoff is restricted based on monitoring information obtained by the laser sensor 312 (e.g., a case where a person, an object, another flying object, or the like exists within the port).

If the flying object 2 has received the possibility information about the takeoff non-permission via the wireless communication unit 204 (step S24), the flying object 2 performs processing (step S25). If the flying object 2 has waited, the port management apparatus 3 outputs flying object position information about standby to the flight management apparatus 1 via the flight plan management means 33.

The flying object 2 waits until it receives possibility information about a takeoff permission from the port 300 (step S25). If the possibility information about the takeoff non-permission has been outputted from neither the flight management apparatus 1 nor the port management apparatus 3 (No (N) in step S23) or if the flying object 2 has received the possibility information about the takeoff permission (Yes (Y) in step S26) after waiting in step S25, the flying object 2 performs takeoff processing (step S27).

If the takeoff of the flying object 2 has been completed, the port management apparatus 3 outputs flying object position information about takeoff completion to the flight management apparatus 1 via the flight plan management means 33.

According to the present invention, the flight plan among the ports can be implemented by changing the flight plan of the flying objects based on the flying object position information or a change of another flight plan.

The flight plan can be changed when the port is congested with the flying objects, for example, so that the congestion can be alleviated and the working quality can be improved.

It is possible to determine flight possibility related to the flight among the ports and correct the flight plan in consideration of an influence of wind around each of the ports.

It is possible to determine flight possibility related to the flight among the ports and correct the flight plan while enhancing safety related to people, flying objects and transport objects.

INDUSTRIAL APPLICABILITY

It is possible to provide a flight management system that manages the landing and takeoff of a flying object on and from a port and flight plans and allows for efficient implementation of an object delivery plan using a flying object.

REFERENCE SIGNS LIST

1 Flight management apparatus
10 Flight plan registration means
11 Flying object information reception means
12 Flight plan change means
13 Instruction information output means
14 Wind information reception means
15 Wind information management means
16 Flight information management unit
16a Flight plan management means
16b Flying object information management means
16c Port information management means
16d Flight region management means
16e Transportation management means
101 CPU
102 Memory
103 Storage device
104 Input device
105 Output device
106 Communication device
107 Operating system
108 Flight management program
2 Flying object
20 Landing point change means
21a Landing request output means
21b Takeoff request output means
22 Possibility information reception means
23 Flight operation control means
24 Landing operation control means
25 Takeoff operation control means
201 Main control unit
202 Motor
203 Motor controller
204 Wireless communication unit
205 Measurement device
206 Image pickup unit
207 Signal reception unit
208 Landing control unit
3 Port management apparatus
30a Landing request reception means
30b Takeoff request reception means
31 Determination means
31a Landing possibility determination means
31b Takeoff possibility determination means
32 Possibility information output means
33 Flight plan management means
34 Possibility information reception means
36 Monitoring information reception means 37 Port monitoring means
38 Wind information reception means
39 Wind information management means
300 Port
301 CPU
302 Memory
303 Storage device
304 Input device
305 Output device
306 Communication device
307 Operating system
308 Port management program
311 Vane anemometer
312 Laser sensor
313 Signal transmission unit
314 Marker
4 Wind environment simulator
5 User terminal
L Flight path
LO Transport object
ST Start point
GL Landing point
CP Relay point
SG Signal

The invention claimed is:

1. A flight management system comprising:
a plurality of port management apparatuses that respectively manage ports on and from which flying objects land and take off and a plurality of wind sensors installed at each of the ports, each of the port management apparatuses comprising a processor and a memory; and
a flight management apparatus that manages a flight plan of the plurality of flying objects that autonomously fly among the ports, the flight management apparatus comprising a processor and a memory, wherein
the processor of the port management apparatuses is configured to:
receive wind information from one of the plurality of wind sensors; and
send the wind information to the flight management apparatus, and
the processor of the flight management apparatus is configured to:
receive flying object information including flying object position information about a position of each of the flying objects;
register the flight plan for flying between the port as a start point and the port as a target point;
determine congestion of the flying objects based on the flying object position information and the flight plan and to change the flight plan; and
output instruction information for instructing the flying object about the flight plan.

2. The flight management system according to claim 1, wherein
each of the port management apparatuses is configured to receive monitoring information from a monitoring sensor installed in the corresponding port and in a monitoring region including at least a part of the port.

3. The flight management system according to claim 1, wherein
each of the ports comprises four or more signal transmission units that respectively transmit short-range wireless signals to the flying objects, and
each of the flying objects moves to a landing point of the port based on the signals respectively transmitted from the signal transmission units.

4. The flight management system according to claim 1, wherein
each of the flying objects comprises an image pickup unit for picking up images of markers respectively displayed on the ports, and moves to a landing point based on the images picked up by the image pickup unit.

5. The flight management system according to claim 1, wherein
the processor of the flight management apparatuses is configured to transfer to the port management apparatus, information regarding permission for landing or takeoff, and
the processor of the port management apparatuses is configured to transfer to the flying object whether or not landing or takeoff of the flying object on or from the corresponding port is possible based on the information regarding permission.

6. A flight management system for managing a flight plan of a plurality of flying objects that autonomously fly among ports, wherein a plurality of wind sensors are installed at each of the ports, the flight management system comprising:
one or more processors; and
a memory storing computer-executable instructions that, when executed, cause the one or more processors to perform acts comprising:
receiving wind information from one of the plurality of wind sensors;
receiving flying object information including flying object position information about a position of each of the flying objects;
registering the flight plan for flying between the port as a start point and the port as a target point;
determining congestion of the flying objects based on the flying object position information and the flight plan, and changing the flight plan; and
outputting instruction information for instructing the flying object about the flight plan.

7. The flight management system according to claim 6, wherein the memory further stores computer-executable instructions that, when executed, cause the one or more processors to perform acts comprising:
determining whether or not landing or takeoff of the flying objects on or from each of the ports is possible; and
transferring to the flying object possibility information about landing or takeoff possibility.

8. A flight management method using a plurality of port management apparatuses that respectively manage ports on and from which flying objects land and take off and a plurality of wind sensors installed at each of the ports, and a flight management apparatus that manages a flight plan of the plurality of flying objects that autonomously fly among the ports, wherein
the flight management method comprises:
receiving, by each of the port management apparatuses, wind information from one of the plurality of wind sensors;
sending, by each of the port management apparatuses, the wind information to the flight management apparatus;
receiving, by the flight management apparatus, flying object information including flying object position information about a position of each of the flying objects;

registering, by the flight management apparatus, the flight plan for flying between the port as a start point and the port as a target point;

determining, by the flight management apparatus, congestion of the flying objects based on the flying object position information and the flight plan, and changing the flight plan; and outputting, by the flight management apparatus, instruction information for instructing the flying object about the flight plan.

* * * * *